US005896705A

United States Patent [19]

Salmonowicz et al.

[11] Patent Number: 5,896,705

[45] Date of Patent: Apr. 27, 1999

[54] ROD GUIDE

[75] Inventors: Mark Stephen Salmonowicz, Royal Oak; David C. Camp, Warren, both of Mich.

[73] Assignee: General Motors Corporation, Detroit, Mich.

[21] Appl. No.: 08/872,122

[22] Filed: Aug. 15, 1996

[51] Int. Cl.$^{6}$ .......... B60J 5/04

[52] U.S. Cl. .......... 49/502; 49/503

[58] Field of Search .......... 49/503, 502, 352, 49/356; 296/146.5, 146.6, 146.7, 146.9; 248/74.1, 74.2, 634, 638

[56] References Cited

U.S. PATENT DOCUMENTS

| | | | |
|---|---|---|---|
| 2,790,614 | 4/1957 | Miller | 248/74.1 |
| 4,705,245 | 11/1987 | Osada | 24/16 PB |
| 4,728,064 | 3/1988 | Caveney | 24/16 PB |
| 4,944,475 | 7/1990 | Ono et al. | 24/16 PB |
| 4,989,822 | 2/1991 | Fannon | 248/74.2 |
| 5,131,613 | 7/1992 | Kamiya et al. | 24/16 PB |
| 5,207,694 | 5/1993 | Broome' | 24/16 PB |
| 5,251,403 | 10/1993 | Compeau et al. | 49/502 |
| 5,492,379 | 2/1996 | Staser et al. | 49/503 |
| 5,573,297 | 11/1996 | DeRees | 49/502 |
| 5,615,504 | 4/1997 | Peterson et al. | 24/16 PB |

*Primary Examiner*—Daniel P. Stodola
*Assistant Examiner*—Curtis A. Cohen
*Attorney, Agent, or Firm*—Charles E. Leahy

[57] ABSTRACT

A rod guide including an elongated strip base for connection with a vehicle door panel and to encircle an elongated control rod mounted adjacent the door panel, the strip base being spaced away from the rod; at least one mesh wing with a base end connected with the strip base, the mesh wing angularly extending from the strip base and the wing having a contact end for encircling contact with the control rod and dampening any transverse movement of the control rod while freely allowing generally linear movement of the control rod.

3 Claims, 3 Drawing Sheets

ROD GUIDE

FIELD OF THE INVENTION

The field of the present invention is that of rod guides, particularly for rod guides used on automotive doors, to prevent a rod from a vehicle door latch to a door release handle or locking release handle from rattling inside the vehicle door.

BACKGROUND OF THE INVENTION

Many vehicle doors have an interior door handle at the front end of the vehicle door. The vehicle door handle controls a door latch which is placed in the door towards a rear end of the door.

A control rod guide is typically provided to transfer movement from the door handle to the rear latch. A rod guide typically provides alignment for the control rod. The rod guide also prevents the control rod from rattling within the vehicle door. In U.S. Pat. No. 5,251,403 issued Oct. 12, 1993, to Compeau et al. and assigned to the assignee of the present invention, a rod guide is formed integrally with a plastic mounting panel which is provided inside a vehicle door. The plastic mounting panel mounts the vehicle door regulating hardware.

The rod guide of Compeau et al. provides a cradle having a recess which receives the control rod. A first pair of flex arms are positioned on one side of the cradle and a second pair of flex arms are positioned on the other side of the cradle. The first pair of flex arms reach over the top of the recess and are bent inwardly so that the control rod may be thrust into the recess by deflecting the first pair of flex arms outwardly. The first set of flex arms restore themselves and lock the control rod against removal. The second set of flex arms are similar in construction and operation.

To reduce noise within the vehicle, and also to lower ergonomic efforts associated with opening and closing a vehicle, some of the newly developed automotive door latches have lower release effort requirements. This allows the door to open with a lower force pull being exerted on the interior release handle. However, the rod guide of Compeau et al. places linear friction forces upon the control rod which place a limit on the minimum force requirements for pulling on the door release handle.

It is desirable to provide a rod guide which can laterally secure the control rod yet impose very low frictional loads upon the control rod during linear movement of the control rod.

SUMMARY OF THE INVENTION

The present invention provides a control rod which laterally restrains the control rod and prevents the control rod from rattling while imposing virtually no friction upon the control rod during its linear movement.

In a preferred embodiment, the rod guide of the present invention provides an elongated polymeric strip base which is connected with a vehicle door panel. The present invention rod guide also encircles the control rod mounted adjacent the vehicle door panel. Connected with the strip base are opposing wings which are angularly extending from the strip base. The wings at their ends have a contact surface encircling the control rod. The rod guide of the present invention provides lateral stability and dampening for the control rod while at the same time imposing virtually no friction upon the linear movement of the rod. Therefore, the rod guide of the present invention is ideal when utilized with progressive door latches which require low release effort.

Other advantages of the. present invention will be more apparent to those skilled in art from the following description and accompanying drawings.

DETAILED DESCRIPTION OF THE DRAWINGS

Figure 1:
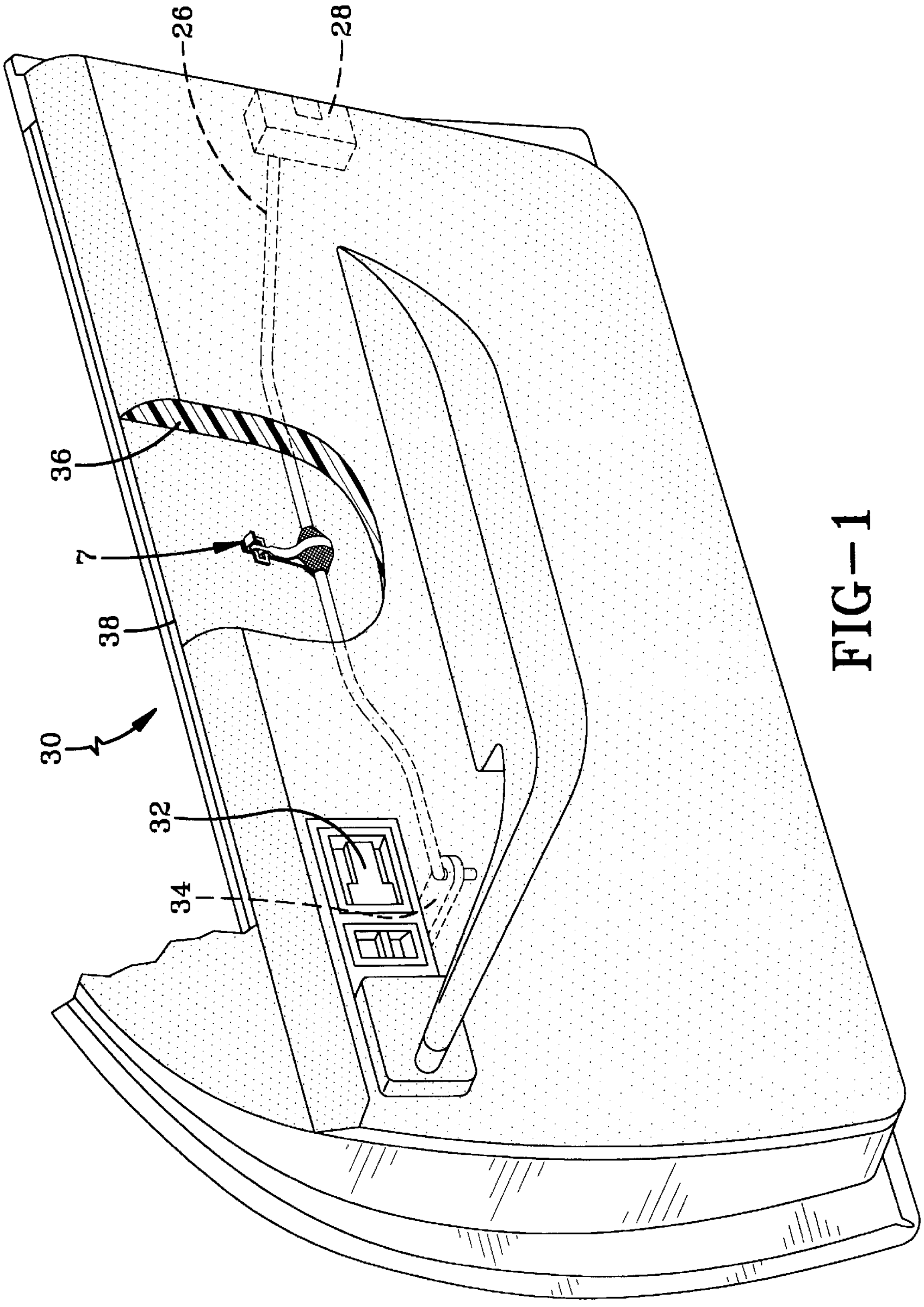
FIG. 1 is a perspective view of a preferred rod guide according to the present invention shown in its it environment inside of a vehicle door.
Figure 2:
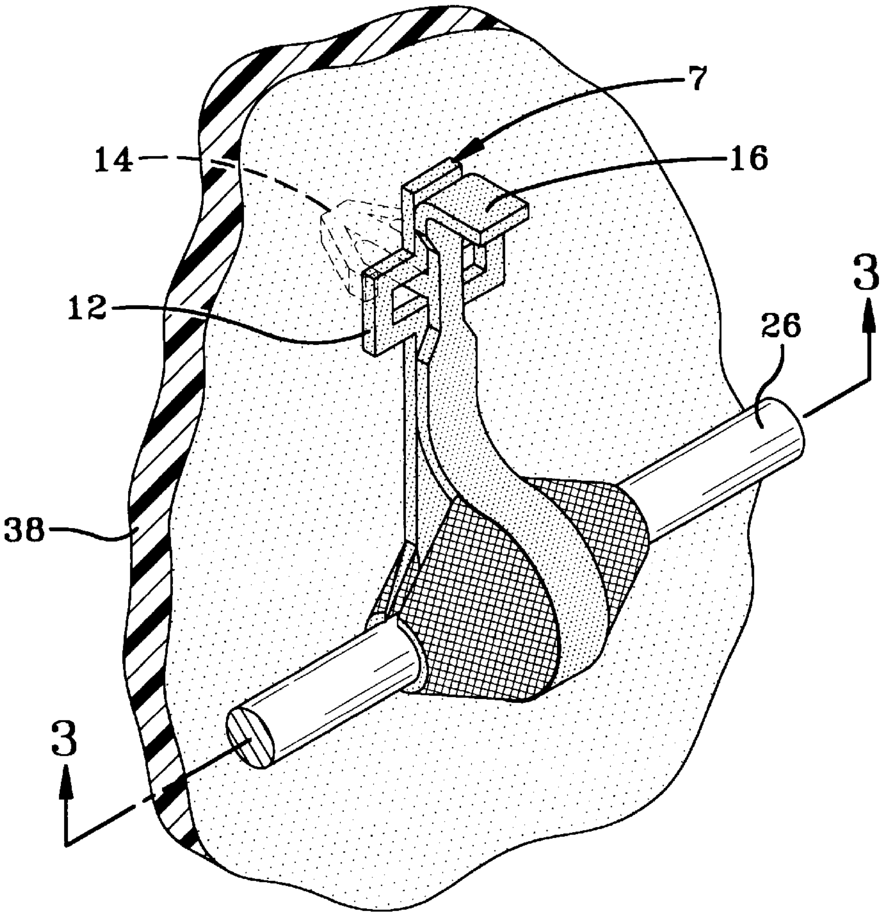
FIG. 2 is an enlarged perspective view of the rod guide shown in FIG. 1.
Figure 3:
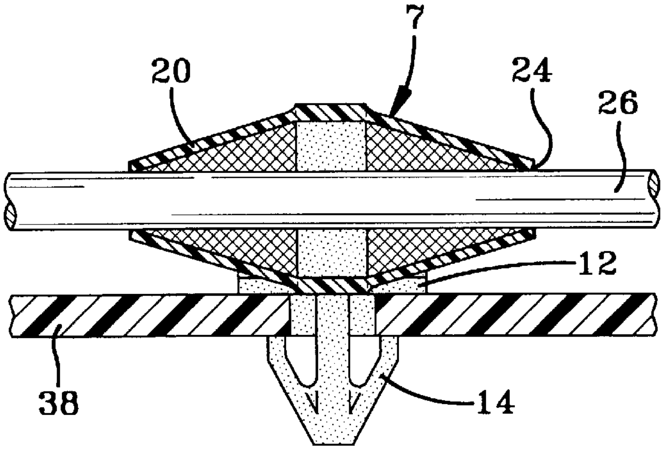
FIG. 3 is a view taken along line 3—3 of FIG. 2.
Figure 4:
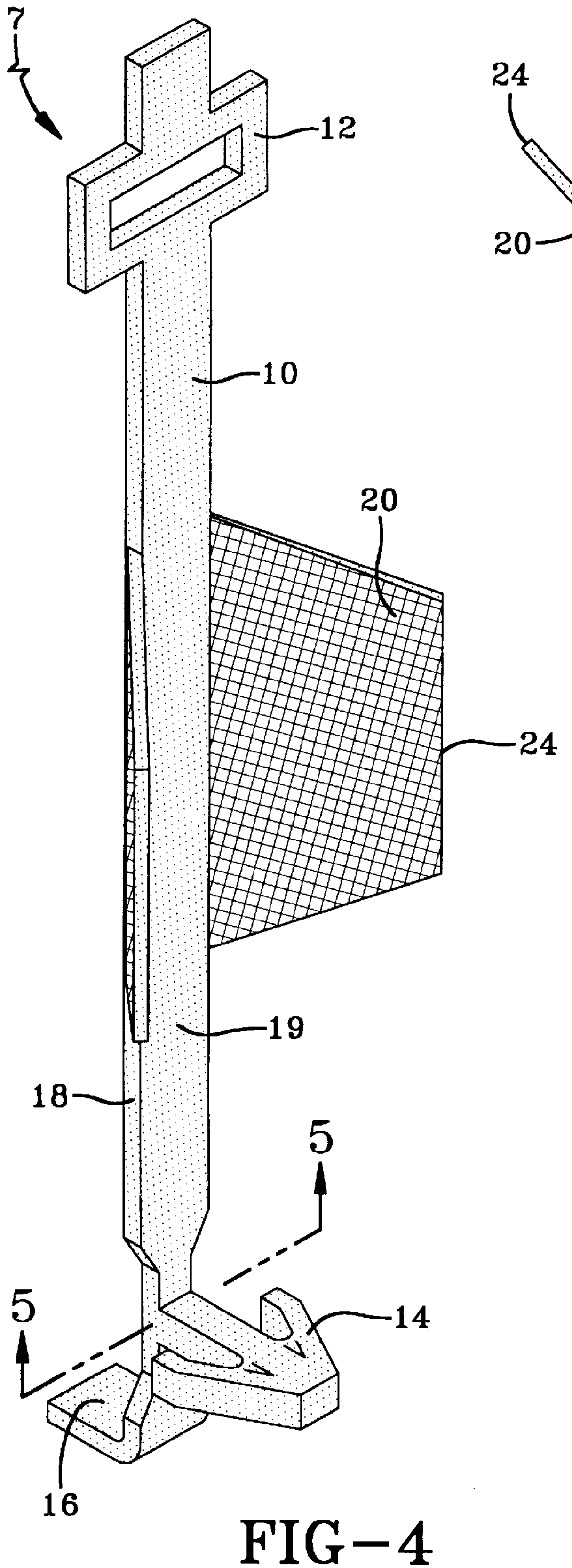
FIG. 4 is a perspective view of the rod guide according to the present invention in its extended free state.
Figure 5:
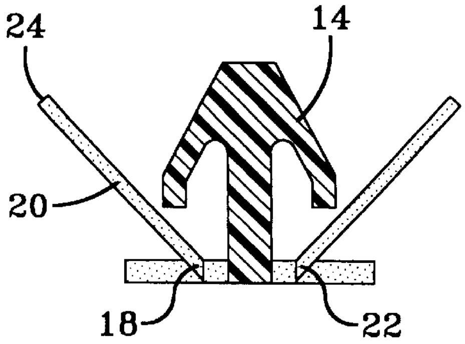
FIG. 5 is a view taken along line 5—5 of FIG. 4.

Referring to FIGS. 1 through 5, the rod guide 7 of the present invention has a strip base 10. The strip base 10 is made from a flexible plastic, such as polypropylene or nylon, or other suitable polymeric alternative. The strip base 10 typically has a width of 4–6 mm and a thickness of 1.5 mm.

At one end of the strip base 10 is an eyelet 12. The opposite end of the strip base 10 has an arrow fastener 14. In close proximity to the arrow fastener 14 is a pull or thumb tab 16. Joined to the sides 18 of the strip base 10 are two trapezoidally shaped meshed wings 20. The wings are formed from 0.5 mm diameter strings of plastic forming diamond shaped equal length leg parallelograms with dimensions of 3 mm×9 mm. The wings 20 are formed internally in a mold with the strip base 10.

The wings 20 have one end 22 connected with the side 18 and extend at an angle of approximately 45 degrees. The wings have a contact end 24 which contacts and encircles a control rod 26, as will be explained later.

In operation, the control rod 26 connects a door latch 28 at a rear end of a vehicle door 30 with a door handle release lever 32. The door handle release lever 32 is operationally associated with a lever 34 which is connected with the control rod 26. The control rod 26 is laterally covered from the interior of a vehicle door by an interior door panel 36. The control rod 26, which is generally mounted adjacent the interior panel 36 and an intermediate door panel 38, is allowed to translate in a generally linear fashion to transfer movement from the door handle release lever 32 to the door latch 28.

To prevent the control rod from moving transversely and rattling within the door 30, the rod guide 7 is utilized. The eyelet 12 of the rod guide is brought in line with a corresponding aperture in the door panel 38. It should be noted that the intermediate door panel 38 may be an interior panel of the door or a panel provided for mounting of the door regulator hardware (not shown). The arrow fastener 14 is then brought up to and penetrated into the eyelet 12 wherein it is expanded behind the panel 38.

The wings 20 are brought into contact with the control rod 26 preventing the control rod from contacting panel 38 or interior panel 36 while at the same time providing lateral dampening for any transverse movement of the control rod 26, and therefore preventing any associated rattling noises. Due to its configuration, resistance to transverse movement of the control rod 26 will be increased upon any translational movement of the control rod 26.

However, the wings 20 will exert virtually no frictional resistance to translational movement of the control rod 26 as the door handle release lever 32 is actuated or released. Therefore, vehicle door applications which have low effort latches, such as provided in door latch 28, can be utilized without the induced friction normally associated with prior rod guides. To allow for disassembly of the control rod 26, the pull tab can be pulled upon to release the rod guide from its connection with the panel 38.

While this invention has been described in terms of a preferred embodiment thereof, it will be appreciated that other forms could be adapted by one skilled in the art. Accordingly, the scope of this invention is to be considered limited only by the following claims.

What is claimed is:

1. In combination, a rod guide mounted on a vehicle door panel and guidably encircling a rod extending along the door panel between a handle and a door latch, said rod guide comprising:

a one-piece molded flexible polymeric member including an elongated base strip having one end, an opposite end, and two opposing side edges and being bent to encircle the rod upon attachment of the ends to the door panel, and a pair of opposed mesh wings of mesh material molded integral with the base strip and extending obliquely from the side edges of the base strip so that the mesh wings encircle the rod and extend into encircling contact with the rod and flexibly bear upon the rod to provide rattle-free translation of the rod relative to the door panel.

2. A rod guide as described in claim 1 wherein the one end of the strip base has an eyelet and the opposite end of the strip base has an arrow fastener for insertion through the eyelet.

3. A rod guide as described in claim 2 wherein the end of the strip base having the arrow fastener also has a thumb tab.

* * * * *